United States Patent [19]
Valery et al.

[11] Patent Number: 6,129,313
[45] Date of Patent: Oct. 10, 2000

[54] SYSTEM FOR DAMPING AND DISTRIBUTING THE STRESS EXERTED ON THE HUMAN BODY DURING AN EMERGENCY EJECTION PROCEDURE BY MEANS OF AN EJECTOR SEAT

[76] Inventors: Pierre Valery; Marc Valery; Jean Valery, all of 79 rue Broca, F-75013 Paris, France

[21] Appl. No.: 09/029,460
[22] PCT Filed: Jul. 18, 1996
[86] PCT No.: PCT/FR96/01124
  § 371 Date: Mar. 5, 1998
  § 102(e) Date: Mar. 5, 1998
[87] PCT Pub. No.: WO97/09235
  PCT Pub. Date: Mar. 13, 1997
[30] Foreign Application Priority Data Sep. 8, 1995 [FR] France .................................. 95/10563

[51] Int. Cl.[7] .......................... B64D 11/06; B64D 25/02; B64D 25/11; B64D 25/102; B64D 25/112
[52] U.S. Cl. ............................. 244/122 A; 244/122 AG; 297/216.1; 297/216.13; 297/216.16; 297/216.17
[58] Field of Search ........................ 244/122 A, 122 AG; 297/216.1, 216.13, 216.14, 216.15, 216.16, 216.17, 464, 465, 468, 470, 472, 473

[56] References Cited

U.S. PATENT DOCUMENTS

| | | | |
|---|---|---|---|
| 3,698,670 | 10/1972 | Ewing | 244/122 AG |
| 3,833,952 | 9/1974 | Rosenberg | 244/122 A |
| 4,437,628 | 3/1984 | Schwartz | 244/122 AG |
| 4,667,904 | 5/1987 | Herndon | 244/122 AG |
| 4,871,131 | 10/1989 | Bernier et al. | 244/122 AG |

FOREIGN PATENT DOCUMENTS

0361369A3  9/1989  European Pat. Off. .

*Primary Examiner*—Peter M. Poon
*Assistant Examiner*—Judith A. Nelson
*Attorney, Agent, or Firm*—Lawrence G. Fridman

[57] ABSTRACT

A device for protection of a spinal column of a pilot during an ejection shock comprises an ejectable seat with a seat back having tensioners integrated therein, a rigid framework and a buttock support. To prevent concentration of the weight of the upper portion of the body on the lumbar/abdominal region, the buttock support is lowered through use of an electromagnetic arrangement retracting connection elements between the seat back and the rigid framework.

12 Claims, 3 Drawing Sheets

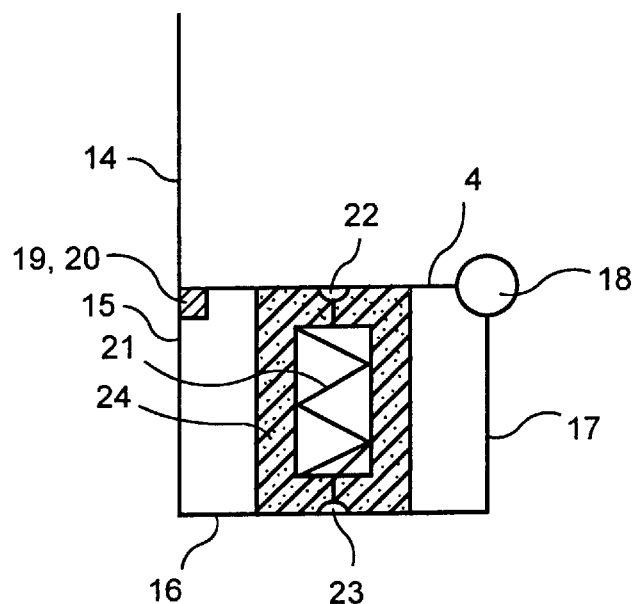
F I G. 4
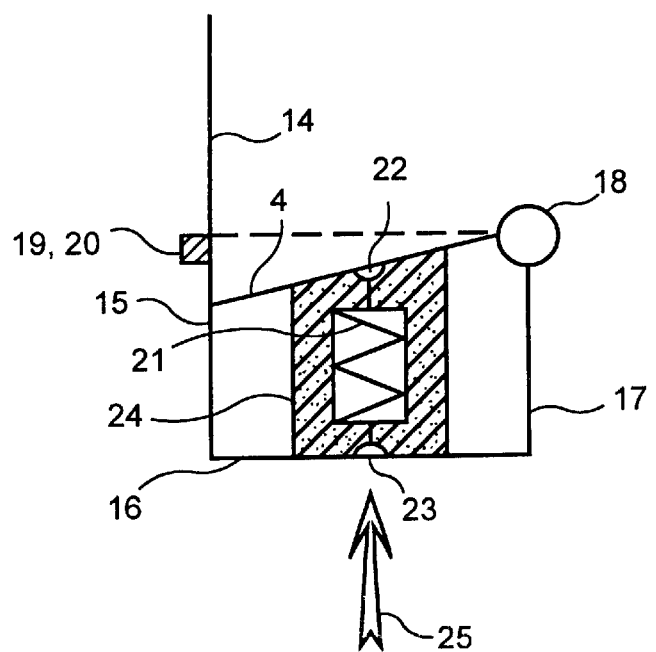
F I G. 5

SYSTEM FOR DAMPING AND DISTRIBUTING THE STRESS EXERTED ON THE HUMAN BODY DURING AN EMERGENCY EJECTION PROCEDURE BY MEANS OF AN EJECTOR SEAT

BACKGROUND OF THE INVENTION

The present invention relates to the use of an emergency ejection procedure by airplane pilots or other crew members immediately upon the need arising for ejection from their aircraft. More particularly, the ejector seat with a standard sub-vertical inclination of this invention preserves the integrity of the pilot's body at the moment of ejection and reduces or even eliminates any risk of consequential physical after-effects and thus, in a hostile zone of operation, increases the pilot's ability to survive.

In the past and conventionally, a pilot was ejected from an aircraft by firing an explosive device situated beneath the center of a seat having a rigid framework, thereby transferring the thrust of the kinetic load of the explosion to the spinal column and rib cage with the consequent risk of serious trauma to various internal organs and the surrounding muscular skeletal structure.

To a large extent, the invention disclosed hereby remedies this severe drawback.

SUMMARY OF THE INVENTION

In this disclosure, the application of the kinetic force and the forces of acceleration caused thereby is altered so that it is exerted independently on the thoracic region (the trunk) and on the abdominal region, thereby dividing the forces applied to the body substantially in half, as follows:

1) first, the trunk of the pilot is placed under tension by a harness thereabout placing the trunk into a sub-vertical traction;
2) second, the buttock support is dropped relative thereto, in a controlled manner. Given the basic structure of the spinal column, the seat can not be dropped more than a few centimeters. While this is necessary, it is at the risk of losing some of the effectiveness of the tension locking on the trunk because of natural or accidental slack. If the slack between the seat back and the pilot's were to amount to several centimeters, such slack would defeat the desired objective of distributing stresses. The dropping of the support must be activated immediately before or simultaneously with the firing of the emergency ejection system.
3) Simultaneous and complementary actuation of the above is essential and constitutes the third fundamental characteristic of the invention.

Thus, immediately prior to ejection, the buttock support of the seat is released and drops in passive, but controlled manner, while the trunk of the pilot is placed under traction against the top of the seat back. Thus, the trunk is suspended for a very short length of time before thrust of the ejection system is applied to the bottom portion of the body.

This device distributes the kinetic forces of ejection between the thoracic and the abdominal regions. In contradistinction thereto prior art systems, in spite of the pilot's back being forced against the seat back, this distribution of kinetic forces is not achieved and the load is essentially concentrated on the bottom portion of the spinal column. This is not improved by the interposing of "airbag" systems and other survival equipment.

Here, unlike the prior art single thrust effect, the present invention provides a "push-pull" effect. Thereby very significantly reducing the chance of injury by substantially halving the mass which is subjected to acceleration and related forces.

BRIEF DESCRIPTION OF THE DRAWINGS

In the following drawings, the same parts in the various views are afforded the same reference designators.

FIG. 4 is a schematic view of the buttock-supporting mechanism for the emergency ejection apparatus of the present invention, said mechanism shown in the flight position;

FIG. 5 is a schematic view similar to FIG. 4, but shown during the ejection procedure;

DETAILED DESCRIPTION OF THE PREFERRED EMBODIMENTS

In the present disclosure, the emergency ejection procedure thereof essentially begins by initiating a signal that electronically actuates a tensioner thereby locking the coupling between the pilot's trunk and the back of the ejectable seat and placing the pilot's trunk in upwardly-directed tension. Although the order to actuate the tensioner precedes by a short time interval the order to fire the emergency ejection unit, the order to release the seat must be independent from those two sequences.

Figure 1:
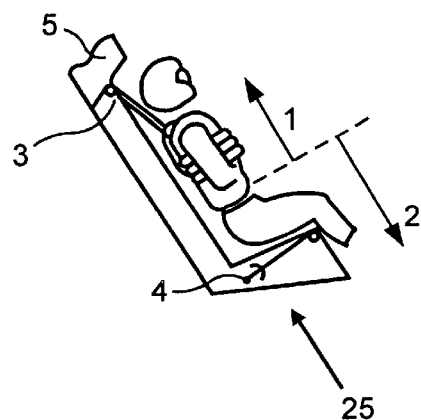
FIG. 1 is a schematic view of the pilot's body in relation to the emergency ejection apparatus of the present invention.

Referring now to FIGS. 1 through 5, the first embodiment is described. In FIG. 1, the manner in which the forces are distributed between the upper portion of the body (1), i.e. the head and the chest, and the lower portion (2) thereof, i.e. the abdomen is shown. This is accomplished by activating harness or flying suit tensioner(s) (3) integrated in the seat back, thereby partially suspending the upper portion of the pilot's body. The force distribution occurs, upon ejection being initiated, in that the suspension of the upper portion is by an amount of the same order of magnitude as the pilot's body weight, and further upon being subjected to ejection thrust (25), by the limited dropping (4) of the support for the pilot's buttocks within the general framework (5) of the ejectable seat.

Figure 2:
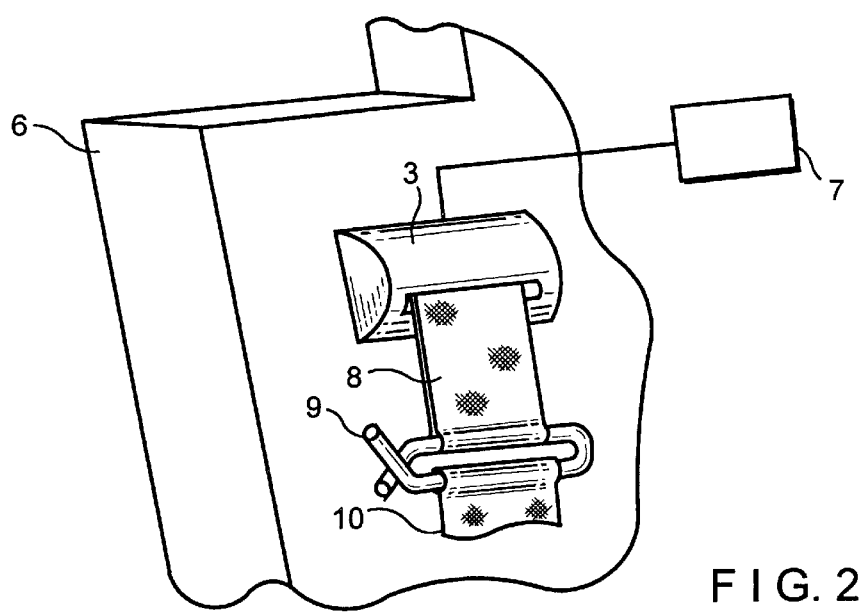
FIG. 2 is a partial schematic view of the emergency ejection apparatus of the present invention shown in FIG. 1.

FIG. 2 shows the principle constituents of a system for partially supporting the pilot. The main elements thereof are the top (6) of the ejectable seat, a microprocessor (7) for controlling the ejection procedure, structural or add-on tensioners (3) that are electronically locked, and that are connected via a belt (8) and an open loop (9) to braces (10) connected beneath the pilot's armpits. Under a zero load factor, the tensioner locks upon experiencing a traction force of about 15 kilograms.

Figure 3:
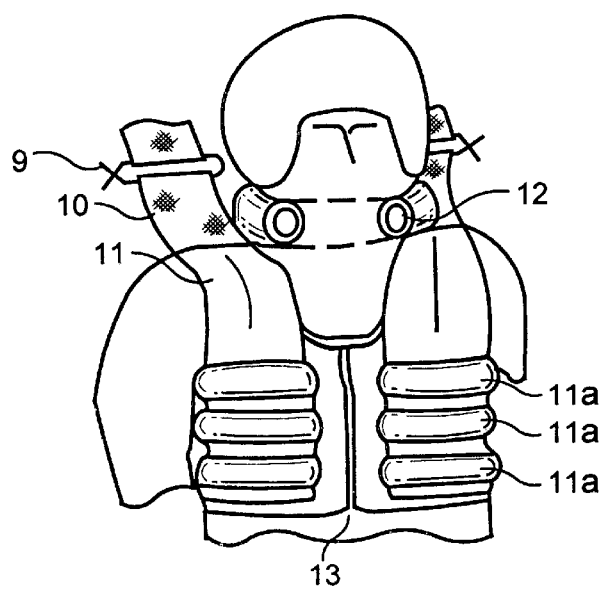
FIG. 3 is a schematic view of the harness of the emergency ejection apparatus of the present invention shown in relation to the pilot's body.

The harness, FIG. 3, for the emergency ejection system is used as shown beneath the armpits. While, in this case, the harness (11) is designed as a separate harness that is in addition to the standard pilot's harness, it is understood that the harness could also be designed integrally therewith. The a harness (11) for the trunk comprises tubular components (11a) providing a total airbag function for the thoracic region and is constructed to be worn about the trunk and beneath the armpits. The harness (11) is connected via straps (10) and engages a free coupling (9) with two seat-top tensioners. The harness (11) is constructed to include an orthopedic foam neck or airbag-effect collar (12), optionally removable, with the right and left main portions thereof being assembled together via a chest fastening (13). Alternatively the tension locking for the harness beneath the armpits is installable directly under the flying suit and over the pilot's trunk.

In FIG. 4 the profile of a static stylized device of the first embodiment is shown. The device has the following component elements: the seat back (14) and the bucket (15, 16, 17). These components, forming the rigid framework of the ejectable seat, enable by a pivoting action along the front axis (18) to drop the pilot's buttock-support (4). The dropping action is effectuated by retracting symmetrical retractable studs (19, 20). The drop is quickly limited and controlled by a coil spring (21) mounted on pivots (22, 23), which spring assembly is embedded in a block of foam (24) of a density that increases going downwards. The spring/foam damping assembly provides progressive resistance to the load from the bottom portion of the pilot's body downwards to a bottom abutment position. The bottom abutment position is approximately within 10 centimeters of the initial static position. The buttock support drop described herein may be damped by many other means, the spring/foam combination is merely one possibility amongst others, and is not limiting or exclusive.

In operation and during an ejection sequence, the studs (19 and 20), FIG. 5, are retracted under the effect of the ejection thrust field (25). Thereupon, as the studs retract, the buttock support (4) pivots and provides the requisite drop.

Figure 6:
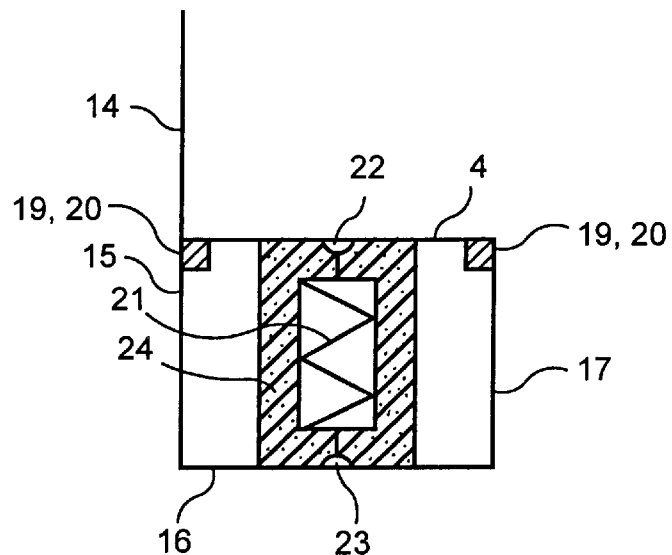
FIG. 6 is a schematic view of a second embodiment of the buttock-supporting mechanism shown in FIG. 4 and is shown in the flight position; and, FIG. 7 is a schematic view similar to FIG. 6 but shown during the ejection procedure.
Figure 7:
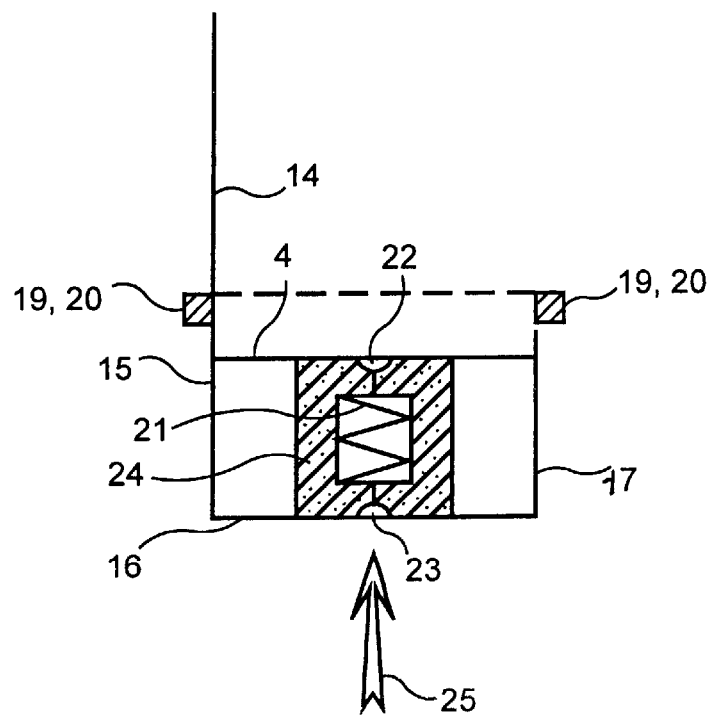

Referring now to FIGS. 6 and 7 a second embodiment is shown. In FIG. 6 the profile view of the static device of the second embodiment is shown. This embodiment provides for the entire pilot's buttock support to drop in a controlled manner. The device has the following components: seat framework elements (14, 15, 16, 17), a buttock support (4) resting on retractable studs (19, 20), which studs are locked electromagnetically or otherwise. A helical spring (21) is attached by fixed or pivoting means (22, 23) between buttock support (4) and framework element (16). Similar to the first embodiment, the spring is embedded in a block (24) of foam of density that increases going downwards. As in the first embodiment, the dropping of the buttock support can be controlled by means of any other system or technique for absorbing motion, with the technique proposed not being limiting.

In operation and during an imposition of an ejection force (25), FIG. 7, after the studs (19, 20) retract, a portion of the weight of the pilot is supported by the device.

The system optionally includes guide rails along edges (15, 17) of the seat bucket and symmetrical rails behind them. As in the first embodiment (FIGS. 4 and 5), the buttock support abutment is provided by the spring/foam assembly.

The figures are schematic in form. The extent to which the buttock support drops has, as indicated above, been approximated. The additional degree of freedom given to the abdominal portion of the pilot's body relative to possible displacement of the thoracic portion thereof has been approximated to be in the range not greater than 10 centimeters. It is theorized that, if the traction anchoring between the seat back and the pilot's trunk were perfect, i.e. with no give, as provided by adjusting the tensioner as a function of the top portion of the pilot's body (FIG. 1), then it would not be necessary to provide assistance from a second device for separating masses. However, the achievement of this optimum condition is highly unlikely because the lack of stiffness in the harness and of the flying suit. Thus to compensate therefor the seat proper is made to be movable.

It is thus possible to analyze as above the two fundamental modifications proposed by the invention on initiation of the ejection procedure to achieve the following objectives:

a) suspending the top portion of the pilot's body (FIG. 1) by electronically activating tensioners (FIG. 3 at 7) as a function of the load factor to which the body is subjected, stiffening the entire harness upwards (FIG. 2 at 8 and 10, and FIG. 10 at 11) and applying pressure to an airbag corset beneath the armpits (FIG. 3 at 11a); and b) releasing the buttock support in controlled manner by retracting its fixing points (FIGS. 4 and 5 at 19 and 20) and (FIGS. 6 and 7).

The above thus serve to dissociate the mass of the spinal column and rib cage into two regions: the thoracic and the the armpits (FIG. 3 at 11a); and b) releasing the buttock support in controlled manner by retracting its fixing points (FIGS. 4 and 5 at 19 and 20) and (FIGS. 6 and 7).

The above thus serve to dissociate the mass of the spinal column and rib cage into two regions: the thoracic and the abdominal region, each of which is half as heavy for given acceleration. The acceleration can than be withstood without damage.

While the accompanying drawings below show the invention in the form of two embodiments for retracting the buttock support, such embodiments are not limiting in any way. Further, variants of the harness device (not shown herein) can be designed by modifying a standard harness, while nevertheless eliminating any functional linkage with the connections for the pelvis belt and the size of the pilot, or by integrating the armpit hardness as described above with the flying suit.

What is claimed is:

1. A device for protection of a spinal column of a pilot during an ejection shock, comprising:

an ejectable seat with a seat back having tensioners integrated therein, a rigid framework and a buttock support, said tensioners being activated by a microprocessor initiating the ejection procedure, action of said tensioners being limited in time and said tensioners relieving a lumbar/abdominal region of a body of a pilot by placing an upper part of a pilot's chest under controlled forces in the direction of an ejection thrust, said forces being directed from a bottom portion toward a top portion of the seat and providing controlled lowering of the buttock support in the opposite direction; and to prevent concentration of the weight of the upper portion of the body on the lumbar/abdominal region, the buttock support is lowered through use of an electromagnetic arrangement retracting connection elements between the seat back and the rigid framework;

whereby the inertia of the ejected mass being substantially reduced suppressing risk of a spinal column trauma.

2. The device according to claim 1, wherein said tensioners consist of a harness situated under armpits of the pilot.

3. The device according to claim 2, wherein said harness is an airbag harness.

4. The device according to claim 2, wherein said tensioners include a passive or airbag orthopedic neck collar combined with a chest harness.

5. The device according to claim 4, wherein said chest harness comprises braces, an open loop for rapid connection between said tensioners and a harness braces, said loop having two converging but independent complementary curved ends provided to facilitate connection and disconnection of said harness.

6. The device according to claim 2, further comprising spring and foam shock absorbing means which operates between a position having substantially minimal resistance and an abutment position during the lowering of the buttock support.

7. A device for protection of a spinal column of a pilot during an ejection shock, comprising:

and ejectable seat for receiving a body of a pilot, said seat having a rigid framework, the pilot being retained with the seat by a chest harness;

a microprocessor for initiating the ejection procedure of said ejectable seat;

said seat comprising a seat back and tensioner means integrated in said seat back, said tensioner means being activated by said microprocessor, action of said tensioner means being limited in time, said tensioner means when activated relieving a lumbar/abdominal region of said body by placing a chest of the pilot under controlled forces in the direction of an ejection thrust, said forces being directed from a bottom portion toward a top portion of the seat, and said seat further comprising a buttock support mounted on said framework to be movable in the direction opposite to the direction of the ejection thrust from a buttock supporting position to a buttock releasing position, restraining means for holding said buttock support in said buttock supporting position and means activated by said microprocessor for releasing said restraining means and for controlled lowering said buttock support from said buttock supporting position to said buttock releasing position, whereby to diminish a risk of a spinal column trauma and to avoid concentration of the weight of the upper portion of said body on the lumbar/abdominal region thereof during the ejection, the inertia of the ejected mass being substantially reduced.

8. The device according to claim 7, wherein said tensioner means comprises a harness situated under armpits of the pilot.

9. The device according to claim 8, wherein said harness is an airbag harness.

10. The device according to claim 7, wherein said tensioners include a passive or airbag orthopedic neck collar combined with said chest harness.

11. The device according to claim 7, wherein said chest harness comprises braces, an open loop for rapid connection between said tensioner means and said harness braces, said loop having two converging but independent complementary curved ends provided to facilitate connection and disconnection of said harness.

12. The device according to claim 7, further comprising spring and foam shock absorbing means which operates between a position having substantially minimal resistance and an abutment position during the lowering of the buttock support.

* * * * *